United States Patent [19]

Flaig et al.

[11] Patent Number: 4,877,987
[45] Date of Patent: Oct. 31, 1989

[54] MOTOR WITH AXIALLY DISPLACEABLE ROTOR

[75] Inventors: Heinz Flaig, Bochum; Udo Neumann, Dortmund; Heinz Hasselmann, Hagen; Karl Zacharias, Schwerte; Rainer Horbach; Harald Bitsch, both of Witten, all of Fed. Rep. of Germany

[73] Assignee: Mannesmann AG, Duesseldorf, Fed. Rep. of Germany

[21] Appl. No.: 946,314

[22] Filed: Dec. 23, 1986

[30] Foreign Application Priority Data

Dec. 24, 1985 [DE] Fed. Rep. of Germany ....... 3546100
Aug. 4, 1986 [DE] Fed. Rep. of Germany ....... 3626270
Aug. 18, 1986 [DE] Fed. Rep. of Germany ....... 3627992
Nov. 3, 1986 [DE] Fed. Rep. of Germany ....... 3637591

[51] Int. Cl.$^4$ .......................................... H02K 17/32
[52] U.S. Cl. ...................... 310/209; 310/77; 310/93; 310/191; 188/70 R; 192/1.37
[58] Field of Search ................. 310/80, 191, 211, 209, 310/77, 92, 93, 76, 78, 100; 188/72.3, 73.1, 218 XL, 70 R, 71.1; 192/2, 1.37, 1.38

[56] References Cited

U.S. PATENT DOCUMENTS

| 2,698,396 | 12/1954 | Stokmans | 310/209 |
| 3,153,159 | 10/1964 | Lord | 310/191 |
| 3,344,294 | 9/1967 | De Castelet | 310/191 |
| 3,683,217 | 8/1972 | Agalakov | 310/211 |
| 3,788,099 | 1/1974 | Miller | 192/106.1 |
| 4,569,638 | 2/1986 | Harker | 310/191 |

FOREIGN PATENT DOCUMENTS

| 0474913 | 3/1929 | Fed. Rep. of Germany | 188/71.1 |
| 1015117 | 9/1958 | Fed. Rep. of Germany | 310/20.9 UX |
| 1053083 | 3/1959 | Fed. Rep. of Germany | 310/209 |
| 1131787 | 6/1962 | Fed. Rep. of Germany | 310/209 |
| 2811563 | 11/1978 | Fed. Rep. of Germany | 310/191 |
| 1308252 | 2/1973 | United Kingdom | 310/191 |

Primary Examiner—R. Skudy
Attorney, Agent, or Firm—Ralf H. Siegemund

[57] ABSTRACT

The rotor is held on a shaft by means of a membrane providing an easy resilient deflection in axial direction and being stiff for torque transmission in azimuthal direction. The membrane is star-shaped, or has spiral arms or is of polygonal configuration. A membrane carrier is connected to a central part of the membrane or to polygon corner points; the rotor, through a sleeve extension of a short circuiting ring is connected to peripheral points of the membrane. The carrier is splined to or slip friction coupled to the shaft.

24 Claims, 8 Drawing Sheets

MOTOR WITH AXIALLY DISPLACEABLE ROTOR

BACKGROUND OF THE INVENTION

The present invention relates to an electrical motor with axially displaceable rotor there being a stator winding and the rotor is movable axially in relation to the stator; the axial shift of the rotor is carried out against a brake spring; the spring basically provides for a shift of the rotor between a running disposition and a stopped disposition; the rotor is mounted on a shaft to rotate therewith which shaft is journaled in housing plates of the motor.

A motor of the type to which the invention pertains is shown in e.g. German patent No. 1,015,117. Two different kinds of axially displaceable motors are known. In one kind rotor and shaft are a unit in that they are secured to each other. Shaft and rotor, thus, shift axially as a unit between a brake position and a running position. This approach is disadvantaged by the fact that the bearing for the shaft, particularly roller bearings, are to be designed to permit this axial displacement and it is therefore inherent that certain friciton losses do occur. High friction losses arise particularly during start-up of the motor particularly as the motor shaft output pinion operating the first gear in a transmission output stage, is also being shifted as an inherent result of the shift of the shaft. This additional frictional component can lead to immediate stalling of the motor upon turn-on. Moroever, owing to these additional axial shifts and forces in the gear, that first gear stage cannot be provided with a helical gearing, but regular axial gear arrangement leads to unduly high noise development.

The other kind of motors with axially shiftable rotor provides for a rotor assembly which is axially movable on the shaft. In order to transmit torque a special gear with involute helical gears or special ball gearings are needed. Again, it must be said that these known constructions are disadvantaged by high friction losses and actually the gearing of this complicated configurations may be deflected. The ball gear moreover is a very expensive item and also are prone to deflect. The axial shift during start-up is also here carried out against high friction forces corresponding to the high start-up moment of the motor.

DESCRIPTION OF THE INVENTION

It is an object of the present invention to provide a new and improved electrical, axial shift motor which improves particularly start-up prodecure with very little expenditure.

It is a specific object of the present invention to provide a new and improved electrical motor having a stator, an axially displaceable spring-biased rotor, and a shaft mounted in bearings in a housing.

In accordance with the preferred embodiment of the present invention it is suggested to attain the objects by supporting the rotor in an axially displaceable manner on the shaft by means of axially resilient (elastic) deformable, azimuthally shift torque transmitting element. Preferably the element is one or more membranes and is deformed for a displacement stroke of the rotor by about 1 to 2 mm without necessitating overcoming of friction nor are large deformation forces necessary, the membrane is configured to be rather "soft" in axial direction but very stiff in peripheral direction so as to permit the transfer of torque and to permit also the taking up of transverse forces in radial direction resulting, possible, from any weight and mass imbalances. This deformable element is fastened to one end of the rotor and to a carrier, the latter being connected to the shaft. The other end of the rotor is preferably supported on the shaft either by a spline i.e. slidable structure or another membrane. The motor may be supported on both ends by means of splines in which case the deformation element will not transmit radial forces but only torque. This restriction may suffice in cases but is not preferred. In furtherance of the invention the membrane is fastened to the carrier ring by means of rivetting which through teeth splines is arranged on the shaft to follow the rotation thereof and clamping rings or other structure establishing a firm seat engage grooves on the shaft so as to avoid this membrane mounting from shifting in axial direction. Alternatively, the carrier ring may be coupled to the shaft by means of a slip friction clutch which normally holds but slips only on excess loads on the shaft.

The membrane will have, basically, two configurations. In one configuration it has a central portion by means of which it is fastened to a carrier ring on the shaft; resilient arms extend from that central portion and end in a peripheral portion by means of which the membrane is fastened to the rotor. The other configuration has the rotor and a carrier with fastening points arranged around the axis of rotation, and a polygonal frame-like membrane has alternate corners fastened to the rotor and the carrier.

As the first configuration, the membrane may resemble a star with arms projecting from a central ring. Alternatively, membrane arms may run spirally from that inner ring to a fastening ring. The membrane arms are thus longer and yield more easily. Since the membrane arms must be expected to bear load in both directions of possible rotation the membrane should be actually realized by two membranes with oppositely oriented arms as far as the spiral contour is concerned; these membranes are thus arranged next to each other but are apart by a suitable spacer.

The deformation element in accordance with the other type of configuration may resemble a frame with fastening points along the edges wherein every other fastening point is connected to a sleeve extension of a short circuit ring of the rotor. The in between fastening points are connected to follower arms of the carrier ring on the shaft. This deformation element has sections situated in between the fastening points and in either direction of rotation of the rotor these sections are subject to tension only. The sections between the fastening points permit axial displacement of the rotor relative to the shaft as well as to the carrier ring with very little resistance. The deformation frame-like element is preferably a polygon with an even number of fastening points and in order to save material it may be configured from simple straight or angle bars. Depending upon the load situations several deforming elements can be placed next to each other. In order to provide protection against deflection the follower arms are provided with projections which project into recesses of the aforementioned rotor extensions there being an adequate space between the projeciotns and the recesses.

In furtherance of the invention the fastening point of the deforming element as far as connection to the follower arms are concerned are staggered during assembly relative to the plane of extension the other fastening elements; the staggering being axial by a little more than a half of the stroke of the rotor. The usual axial displacement of several mm obtains by having the sections of the deforming element made from a planar sheet and they have a near S shape. Owing to this shaping a small force is necessary upon axial displacement of the rotor since the very bending soft section will in fact be bent very little and they are not being tensioned. Still the deforming element can be loaded for the transmission of torque either for rotation or for baking.

The deforming element or elements may have their fastening points established by projections of rings which have cutting edges which are forced by the fastening screws into the follower arms of the carrier ring or the rotor extension as the case may be. This way one obtains tolerance compensation and still has positive engagement. SHould there be a danger that the motor could be blocked through some external interference then it is of advantage to protect the drive train through a torque limiting slip friction coupling so as to avoid damage. Accordingly the carrier ring for the membrane may not be splined to but just seated on the shaft and may be provided with a coupling friction surface to obtain the slip friction action. An associated coupling ring bears through a coupling spring against a mounting ring on the shaft. The friction ring in turn has teeth and engages corresponding spline teeth on the shaft. Should the shaft of the motor be blocked for some unforeseen reason as may occur if the device suddenly encounters an impediment, then, on account of the inertial, the rotor will still tend to rotate in relation to the coupling ring carrying the friction. The counteracting friction layer, the coupling ring being secured to the shaft. This continued relative rotation is subject to braking and the degree of braking is determined by the friction engagement on one hand and the tension of the coupling spring on the other hand.

In furtherance of the invention the coupling spring may bear agains the collar of the follower sleeve so as to facilitate assembly. This follower sleeve is splined to the coupling ring as well as the shaft. The carrier ring is rotatable and guided by the follower sleeve.

In order to insure correct and certain switch off of the motor whenever the slip friction clutch responds, a brake ring may be provided connected to the carrier ring through the deformation element and being provided with at least one projecting cam cooperating with a groove the shaft, indirectly through switch actuator, which operates a turn-off switch. The ring has six such cams projecting from the front end of the rotor. To improve operation of the cam switch element may be provided with feeler rollers. The switch element as well as the switch proper may moreover be used for monitoring wear of the brake. Also through axial pressure acting on the switch element, the brake may be released without requiring electric current.

DESCRIPTION OF THE DRAWINGS

While the specification concludes with claims particularly pointing out and distinctly claiming the subject matter which is regarded as the invention, it is believed that the invention, the objects, and features of the invention and further objects, features, and advantages thereof will be better understood from the following description taken in connection with the accompanying drawings in which:

Figures 1, 2, 3:
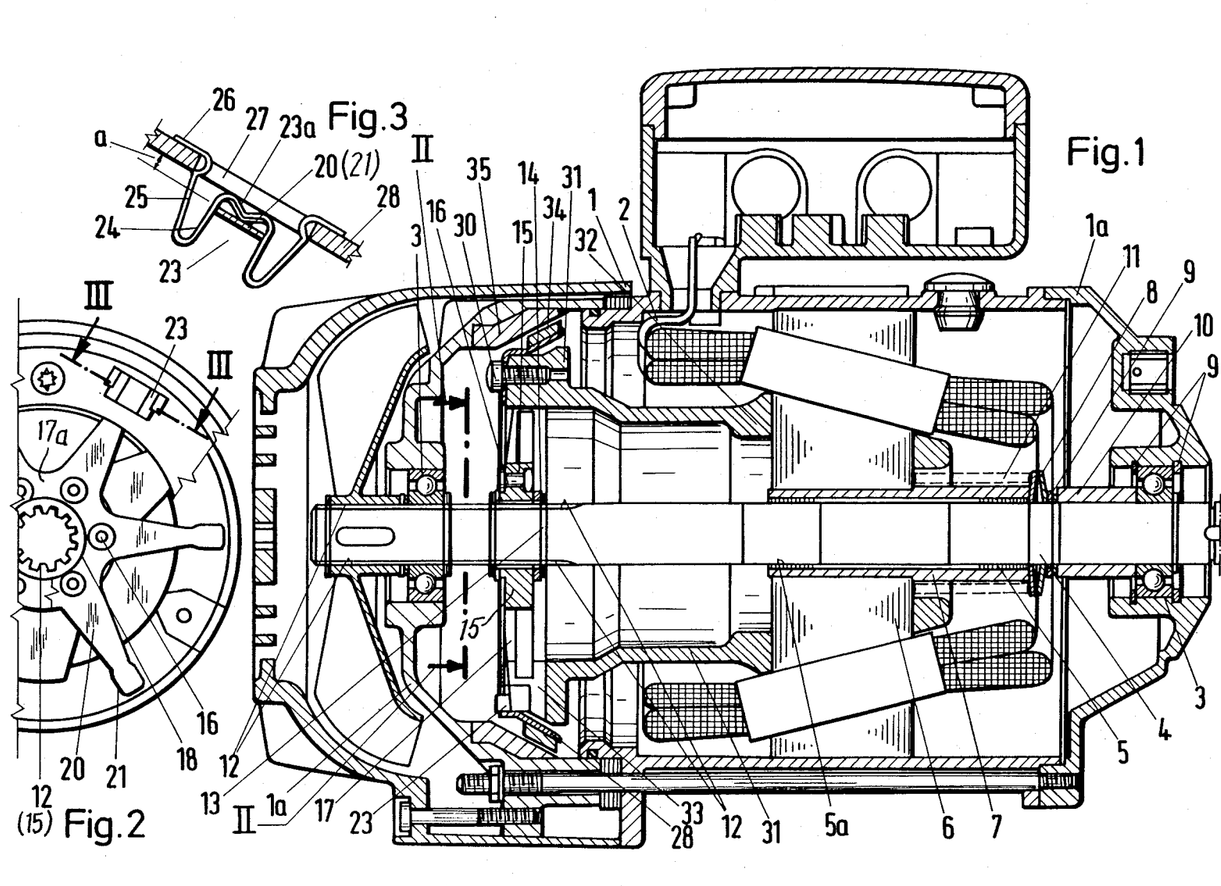
FIG. 1 is a longitudinal section view through a motor improved in accordance with the preferred embodiment of the present invention for practicing the best mode thereof.
FIG. 2 is a section as indicated by II—II in FIG. 1.
FIG. 3 is a section as indicated by III—III in FIG. 2 but illustrating the section on an enlarged scale.

Proceeding now with the detailed description of the drawings FIG. 1 illustrates a motor which includes a housing or casing 1, being basically of cylindrical construction and closed at both ends by two somewhat differently constructed shields and constituting shields ends or end plates 1a of the housing. The housing contains a stator assembly including stator coil 2. The housing end 1a are provided with roller bearings 3. The stationary parts of the bearings 3 are secured to housing 1 against axial displacement under utilization of a spacer tubes 10 and clamping rings 9. A motor shaft 4 carries a rotor 6 which is permitted to undergo axial displacement in relation to the shaft 4 while positively imparting rotation thereupon. The rotor 6 includes a sleeve 7 which rides on a bearing sleeve 5 which, in turn, is secured to the shaft.

The axial displacement of the rotor 6 is limited by a shock absorber or attenuator 8 which bears against one of the clamping rings 9. The shock attenuation absorber 8 is configured from two disk springs and serves in addition as thrust mounts for a brake spring 11 which, on its other end, acts on the axially displaceable rotor 6. The spring 11 urges the rotor 6 against a brake surface 35 on one (left) of the front and housing end 1a of housing 1. The rotor 6 includes the rotor assembly proper as well as a short circuit ring 32. That ring has an axial-radial sleevelike extension 31 which carries a brake ring 28, there being a brake lining 34 interposed by means of which the rotor of the motor may bear against the brake surface 35 whenever the motor is turned off. The spring 11 provides braking pressure force.

The sleeve-like extension 31 has an indent 33 in front of the brake ring 28 and as shown in the lower part of the drawing of FIG. 1. This indent 33 receives a spring 23 which connects the brake ring 28 with an elastically deformable element that is the basic element of the invention. This element is realized as a membrane 17. The membrane can be realized in various configurations but a subclass can be considered to be of tri-part integral construction and configuration. A central part with an aperture for traversal by the shaft, arms that extend from that central part, and a peripheral part or parts for fastening to be described. Presently, additional reference is made to FIG. 2 showing a star-shaped membrane 17 with a central part 17a, arms 20, and peripheral (fastening) ends 21. One of the arms 20 is shown to have its end 21 connected to the brake ring 28 by means of the spring 23; this aspect is shown in detail in FIGS. 2,3.

Proceeding further to FIG. 3 it can be seen that one end 21 of the membrane arm 20 bears flat upon a crimped bar 23a pertaining to the connecting spring 23. This engagement is such that between the membrane arm 20 and the ring 28 a distance "a" is established. The distance permits yielding of the membrane 17 towards the ring 28. As stated, the membrane has a plurality of such arms giving it a star-like appearance. Each of such arms 20 has a laterally effective pressure transmitting end, being the peripheral ends 21 as discernible from FIG. 2 and 4. Each arm bears also against an inner leg 24 of the double U-shaped connecting spring 23. Outer spring legs 25 continue the inner legs 24; after a loop of almost 180 degrees, these outer legs 25 are resiliently yielding and their ends face away from each other and form holding claws or grippers 26. The connecting springs 23 are inserted into respective recesses 27 of the braking ring 28 and held thereto through these claws 26. This way, the membrane 17 is connected to ring 28 and, ultimately, to rotor 6. These connections thus establish fastening points. There are, of course, several such fastening points, e.g. as many as the star membrane has points. These features are shown in the lower part of FIG. 1 as well as in FIGS. 2 and 3.

Figure 4:
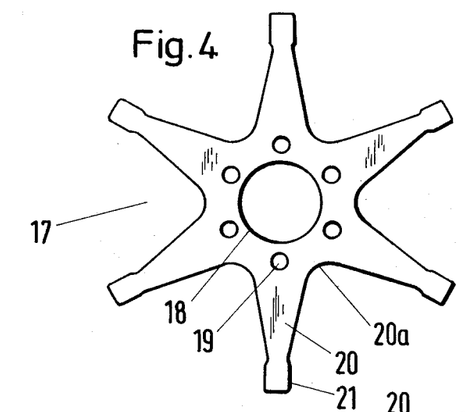
FIG. 4 is a plan view of a star shaped membrane being one of the elements used and included in the motor shown in FIG. 1.

FIGS. 2 and 4 show the membrane 17 having in its central part 17a a central bore 18 as well as bores 19 for receiving rivets 16. These bores 19 are arranged on a circle and establish fastening points that are spaced from the arm ends 21. By means of these rivets and fastening points, the membrane is connected to a carrier ring 15 as shown in FIG. 1. This carrier ring 15 is splined by means of teeth 12 to the shaft 4 for common rotation and to avoid relative rotation to the shaft. Clamping rings 14 fasten the ring 15 to the shaft 4 so as to avoid axial displacement. These rings 14 reach into annular grooves 13 of the shaft 4 to thereby obtain the axial immobility.

It can thus be seen that the rotor 6 is held on shaft 4 by the rotor sleeve 7 for axial displacement upon riding on the two shaft end bearing sleeves 5a, while spring 11 urges the rotor assembly, in the drawings to the left. No rotation or torque is transmitted on this end of the rotor. The other end of rotor 6, as extended by means of the sleeve or sleeve like extension 31 of the short-circuiting ring 32, has the brake ring 28 urged against stationary counter brake lining 34. As the motor is turned on, the rotor is resiliently guided by the deflection of membrane arms 20, there being little friction involved, while the rotor energization pulls the rotor back from the brake and torque is transmitted from rotor 6, via sleeve 31, ring 28, spring 23, arms 20, sleeve 15, spline 12, upon shaft 4.

The membrane 17 as specific deformation element and as shown in FIG. 4 is provided with transition curvatures 20a between the torque transmission arms 20 in order to avoid notching. These round parts are also present in other membranes, for example the disk-shaped membrane shown in FIG. 5 and here particularly in the transition to the peripheral fastening ring 22. This ring 22 is provided with bores 19a in between its membrane arms 20, and these bores register with bores 29 in the brake ring 28 as to receive screws 30. Thus the screws 30 fasten the membrane 17 as well as the break ring 28 to the extension 31 of the short circuit ring 32. The inner ring 17a of the membrane shown in FIG. 5 is also provided with bores 19 for the rivets 16 and there is also provided a central bore 18.

Figure 5:
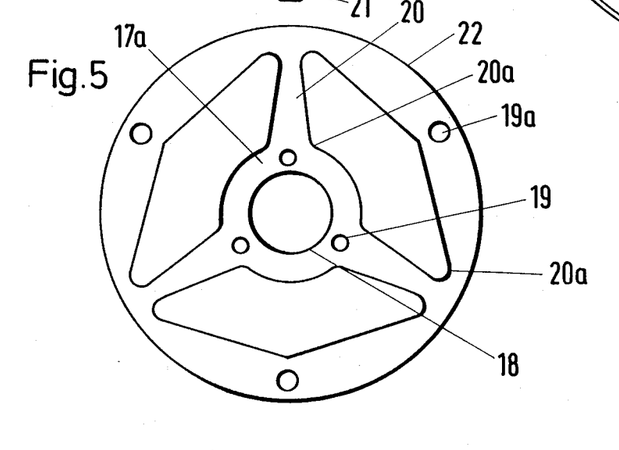
FIG. 5 is amodified membrane of star-disk shaped pattern also usable within the aforementioned motor.
Figures 6, 7:
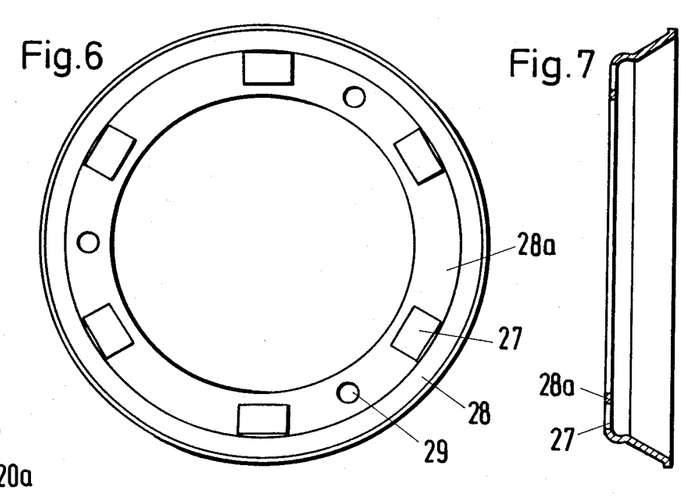
FIG. 6 is an elevation of the brake ring included in the motor of FIG. 1.
FIG. 7 is a cross section through FIG. 6.

FIG. 1 is thus to be interpreted in that in the left upper part of the FIG., the membrane has the configuration of FIG. 5 with screws 30 fastening the peripheral portion of the membrane (here 22) to ring 28, while the lower left of FIG. 1 shows the spring (23) connection of the star-shaped membrane of FIGS. 2 and 4. FIGS. 6 and 7 show, respectively, plan and section views of the brake ring 28 which, in fact, is configured to accommodate both kinds of membranes. There are receivers 27 for the spring (23) for fastening a star membrane, and there are bores 29 for bolting a spring of the kind shown in FIG. 5. Either way, the membrane is peripherally fastened to sleeve extension 31 of the short-circuiting ring 32 of the rotor.

Figure 8:
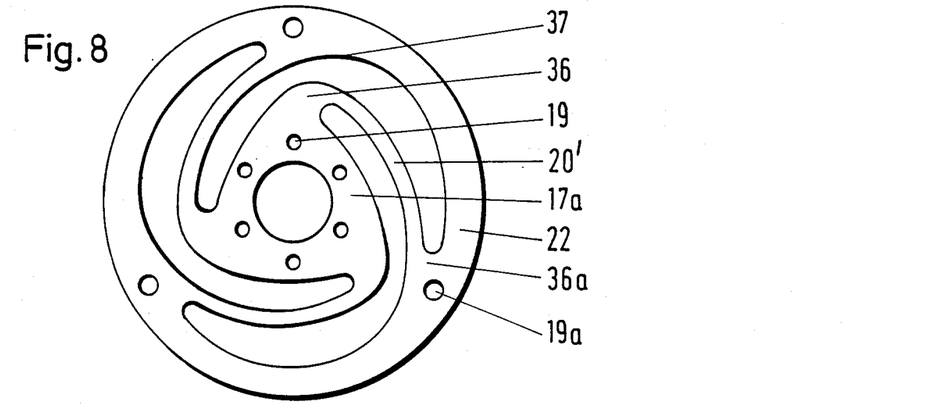
FIGS. 8 and 9 are plan views of membranes with spiral membrane arms of different orientation.
Figures 9, 10, 11:
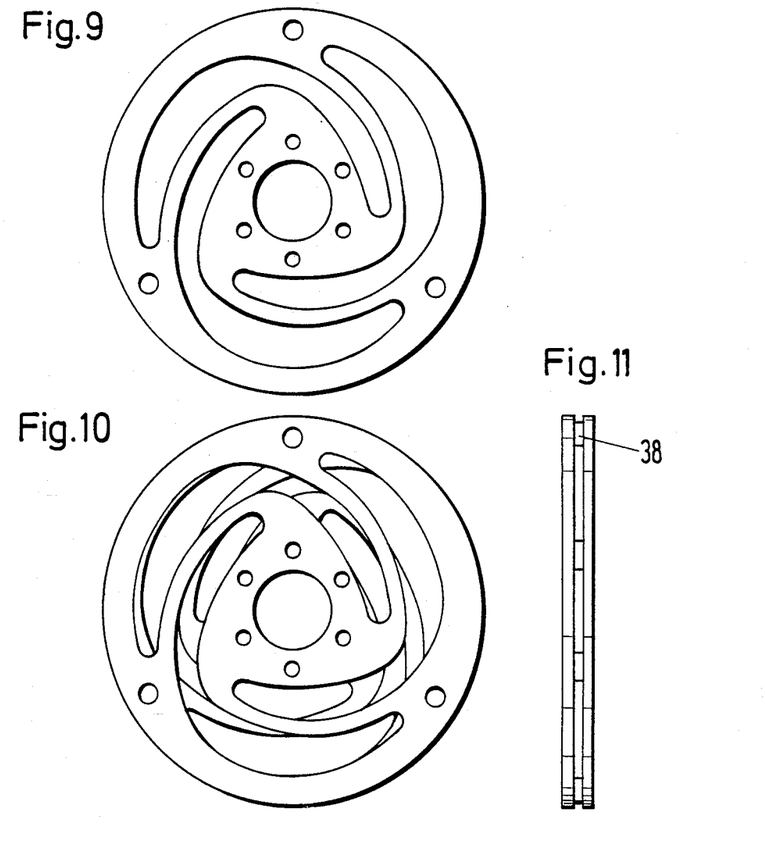
FIG. 10 illustrates in top elevation, the two membranes as superimposed of FIGS. 8 and 9, and usable in the motor shown in FIG. 1.
FIG. 11 is a side view of the composite membrane shown in FIG. 10.

FIGS. 8 and 9 show a further configuration for the membrane 1 to have oppositely spiralling arms 20'. The inner ring 17a and the fastening ring 22 are interconnected through the spiral-shaped arms 20'. The membranes are otherwiese the same. One of them can be folded over with respect to the other one. As shown in FIG. 10, the two membranes are superimposed and jointly fastened to the brake ring 28 by the peripheral bores 19a as well as to the carrier ring 15 via bolts and bores 19. In order to avoid engagement of the oppositely oriented membrane arms for larger deformation the membranes are actually kept apart by means of a spacer 38 (FIG. 11).

Figures 12, 13, 14, 15:
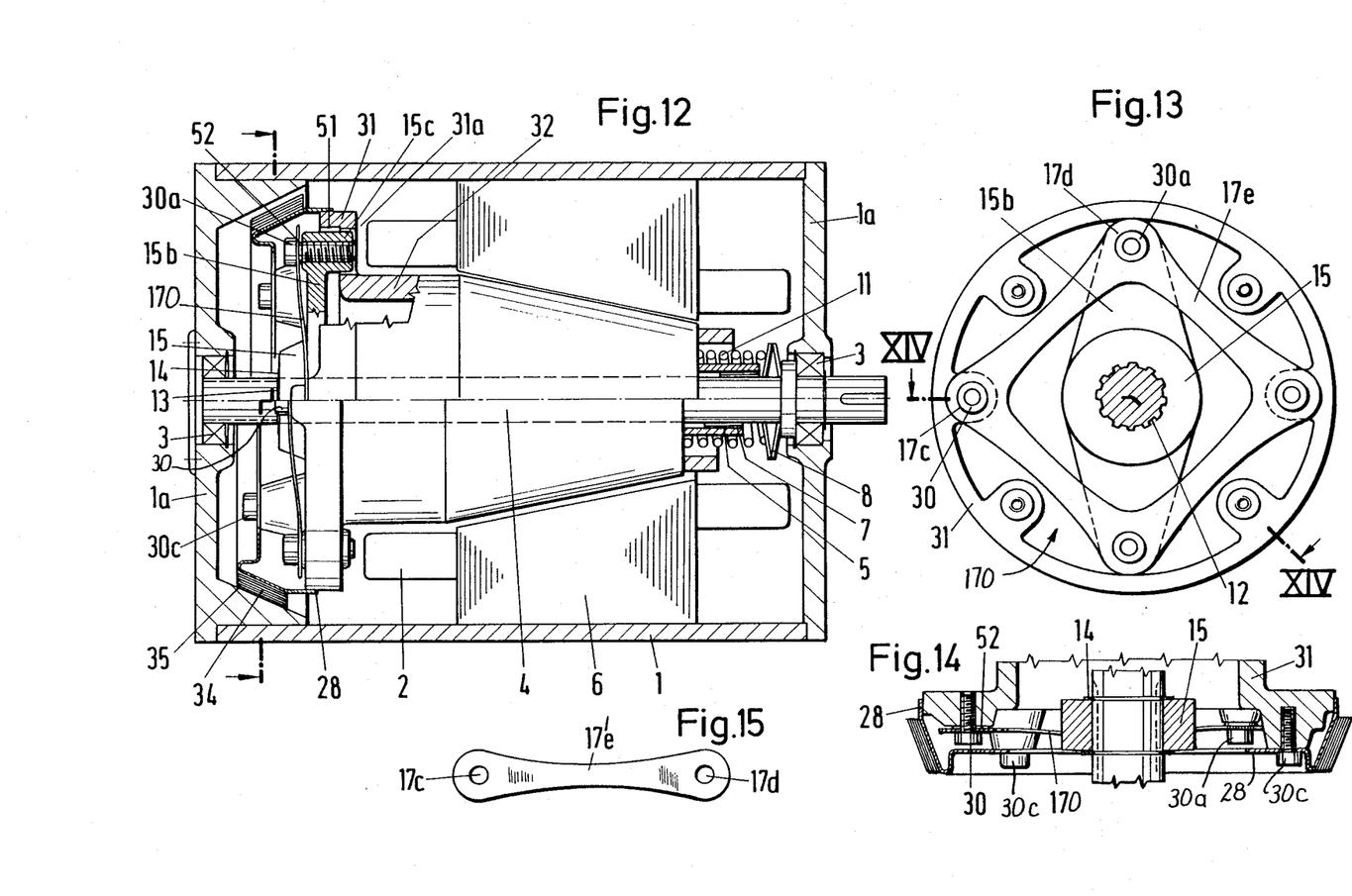
FIG. 12 is a longitudinal section in a somewhat simplified fashion sthill through a motor in accordance with the preferred embodiment of the present invention, but showing a different deformable element.
FIG. 13 is a front view of the deformation element as shown in FIG. 12.
FIG. 14 is a section taken along XIV—XIV as indicated in FIG. 13.
FIG. 15 is a bar-shaped part of a frame-like deformation element used in the embodiment shown in FIG. 12.

FIG. 12 illustrates the axial shift motor and is biparted whereby the upper half of the FIGURE shows the running state for the rotor. The lower half of the FIGURE shows the rotor in braking position. The FIGS. 12-18 show a different configuration for the deforming element. The motor is illustrated in a somewhat schematic-simplified fashion but is otherwise similar to the one shown in FIG. 1, except that the extension sleeve 31' is somewhat differently configured to accommodate a modified version for the deformation element 170 by means of which rotation is imparted from rotor 6 upon shaft 4. The deformation element 170 is of polygonal, e.g. square-shaped configuration. It does not have a central part but arms (17e) and corner fastening points 17c, d.

The extension 31' of the short-circuiting rotor ring 32 has two indents, 31a, they are diametrically opposed i.e.

they are spaced by 180 degrees. The carrier ring 15 is provided with projections 15c on oppositely extending follower arms 15b and these axial projections 15c reach into the indents or pockets 31a; there is a certain clearing space 51 provided all around the projections 15c to the extent of insertion into the respective pocket 31a. The projections 15c have bores for receiving screws 30a by means of which the deforming element 170 is fastened to two fastening points 17d which are offset also by 180 degrees and the connection to the follower arms 15b of the carrier ring 15 is made by bolts 30a. The other, in-between fastening point 17c of the deforming element 170 are connected to radially inwardly extending lugs of the extension 31' of the short circuit ring 32, also by means of bolts or screws 30. The fastening is specifically shown in FIG. 14. The right hand portion of that FIG. shows also the direct fastening of the brake ring 28 by means of screws 30a to lugs of the extension 31. These lugs extend radially inwardly (FIG. 13) as well as axially (FIG. 14).

As stated the upper part of FIG. 12 shows the rotor 6 in position of running and rotation. In the level of the center line of the FIGURE, the deforming element 170 is shown to be connected as stated to the fastening point 17c with the extension 31 of the ring 32 (bolts 30). The deforming element 170 is in fact deformed in this case of rotor resting by half the displacement path towards the rotor 6. After the motor has been switched off the brake spring 11 pushes the rotor 6 as well as the extensions 31 together with the fastening points 17c of the deformation element 170 to the left to now assume the position shown in the lower part of FIG. 12.

The carrier ring 15 with its follower arms 15b is splined with the shaft 4 by means of teeth 12 and also there are clamping rings 14 provided to be inserted in grooves 16 of the shaft 4, for axially immobilizing the fastening ring 15 to the shaft 4 so that the ring 15 will not axially slide onto shaft 4 but will follow its rotation. The spacing 51 defined above permits interference-free shifting of the extension 31 with the indents or pockets 31a relative to the projections 15c of the follower arms 15b. Since the projections 15c project into the pockets 31a they form therewith safety devices.

The sections 17e of the deforming element 170 extending between the fastening points 17c and 17d are of a rather slim configuration as shown in FIG. 13. In order to permit free axial movement of the deforming element 170 shims and disks 52 are provided between the fastening points 17c and 17d on one hand and the follower arm 15b and the lugs of extension sleeve 31 on the other hand.

Figure 16:
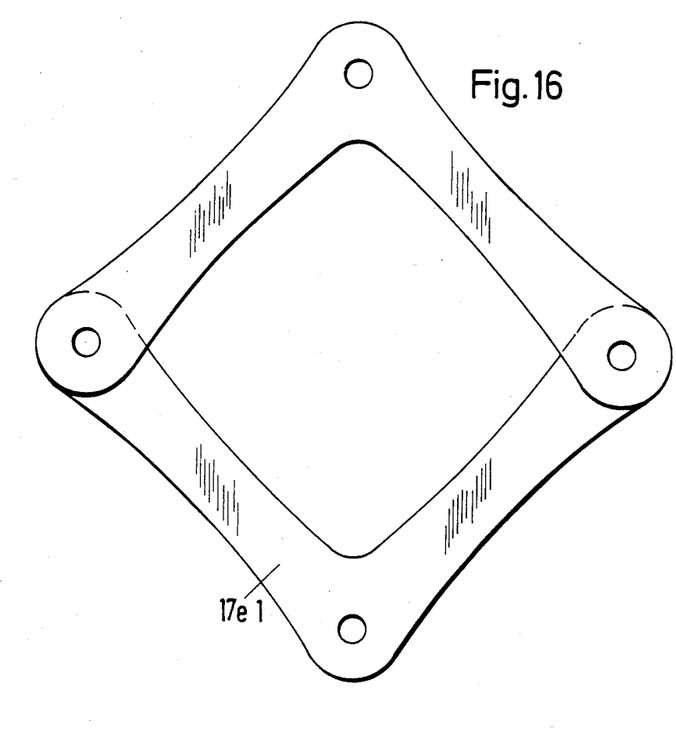
FIG. 16 is a modified frame element for the same purpose using angle pieces.
Figure 17:
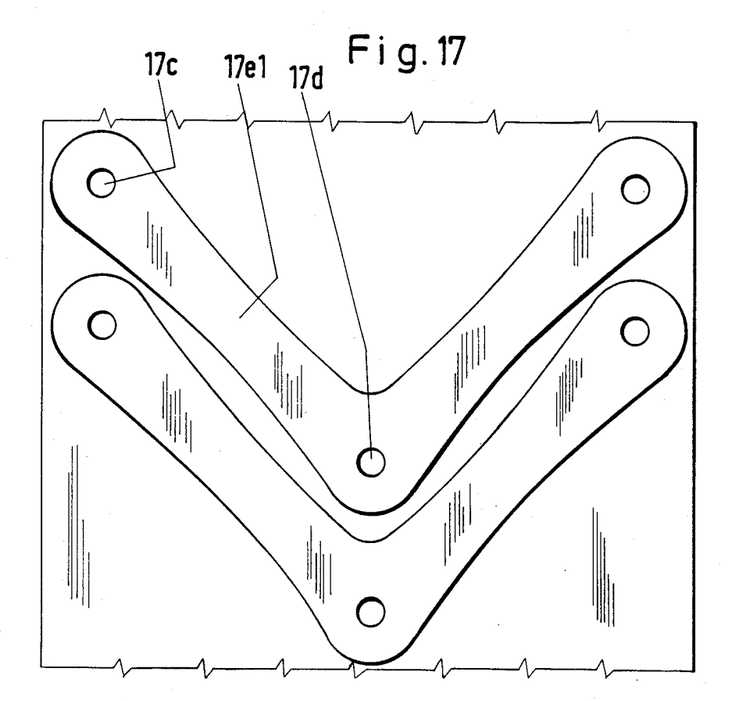
FIG. 17 is a view of blank showing patterns for angle pieces to be made and shown in FIG. 16.

The deforming element could be constructed from simple flat bars having fastening points 17c and 17d at their ends and slim sections 17'e in-between. This is shown specifically in FIG. 15. Alternatively, and as shown in FIG. 16 angle pieces 17e1 can be provided. These angle pieces can be stamped in a material saving fashion from a steel strips as shown in FIG. 17.

Figure 18:
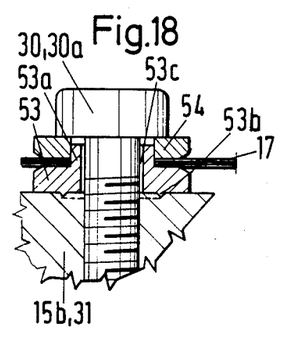
FIG. 18 is a cross section through any one of the fastening points.

FIG. 18 shows another advantageous point of fastening the deforming element 170, the extension 31 and/or to the follower arm 15b. The deforming elements 170 specifically have their fastening points 17c and 17d in abutting relation to a projection 53 of a ring 53. This ring 53 has an annular axial cutting edge 53b by means of which it penetrates forcefully into the material of the extension ring 31 or of the follower arm 15b as the case may be. The bore 53c is larger than the diameter of the screws 30 or 30a so that any kind of tolerances between the bores can be compensated. The head of the respective screw 30 or 30a, urges against a washer disk 14 to compress the deforming elements and thereby forces the annular cutting edge 53b into the follower arm 15b or the extension 31.

In the specific example shown in FIGS. 19–22 the carrier ring 15 for the membrane is permitted to rotate vis-a-vis a receiving follower sleeve 43. The ring 15 in this case is provided with a frictional coupling surface 15a on the side facing the respective deforming element, 17 0r 170. The frictional coupling occurs in relation to a coupling ring 44 having a friction lining. The coupling ring 44 is splined through teeth into the follower sleeve 43. A coupling spring 41 urges the slip friction disks together. The coupling spring 41 bears against a collar 42 of the follower sleeve 43 which sleeve in turn bears against a projecting annulus 4a of the shaft 4. Internal gearings 12 spline the follower sleeve 43 to the shaft 4. Thus the follower sleeve 43 rotably connects the shaft 4 to the coupling ring 44 so that all these parts rotate in unison.

Figure 21:
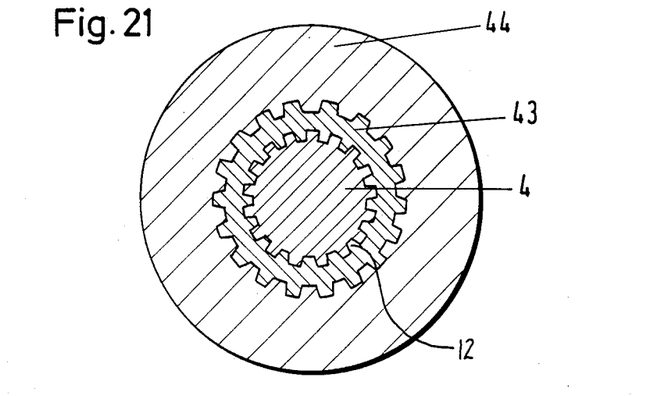
Figure 22:
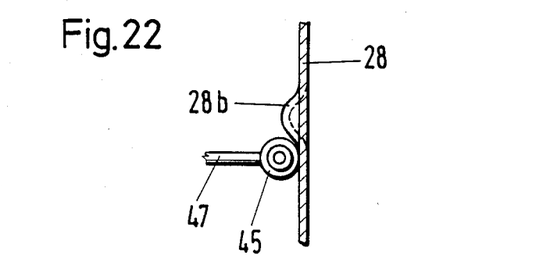

The coupling spring 41 urges the carrier ring 15 by means of its front face against a cam surface 50 which abuts a clamping ring 14 being inserted in the sleeve 43. That ring is made of low friction material. Moreover, the slip friction coupling between carrier ring 15 and coupling ring 44 will normally cause ring 15 to be rotatably coupled to the shaft 4, via the double spline connection of sleeve 43 (FIG. 21).

Figure 20:
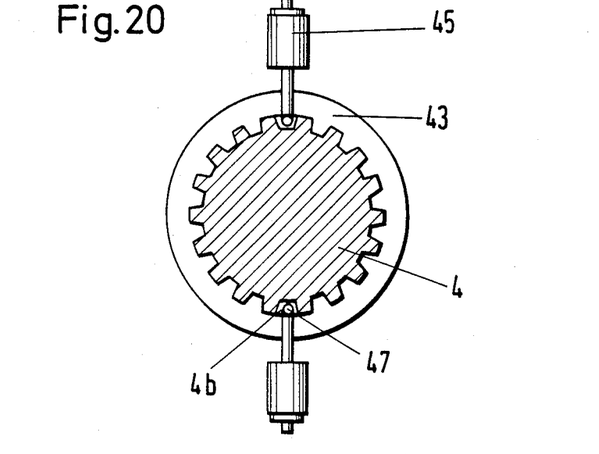
FIGS. 20, 21 and 22 are respectively section views through XX—XX, XXI—XXI and XXII—XXII as indicated in FIG. 19.

The brake ring 28 faces with a particular side the carrier ring 15 and on that side cams 28a are provided for turn-off scanning anc control. The cams are on the periphery of the brake ring 28. The rolls 45 have axles 46 which are connected to a switch actuating element 47. This actuating element 47 is inserted in grooves 4b of the shaft 4 as shown in FIG. 20 and will operate a switch 48, through that part which projects from the shaft 4. The coupling between 15 and shaft 4 (ring 44) may begin to slip, and because the torque transmission from the rotor 6 (via deformation elements 17 or 170) runs through that coupling. The switch 48 will immediately turn off the motor.

Figure 19:
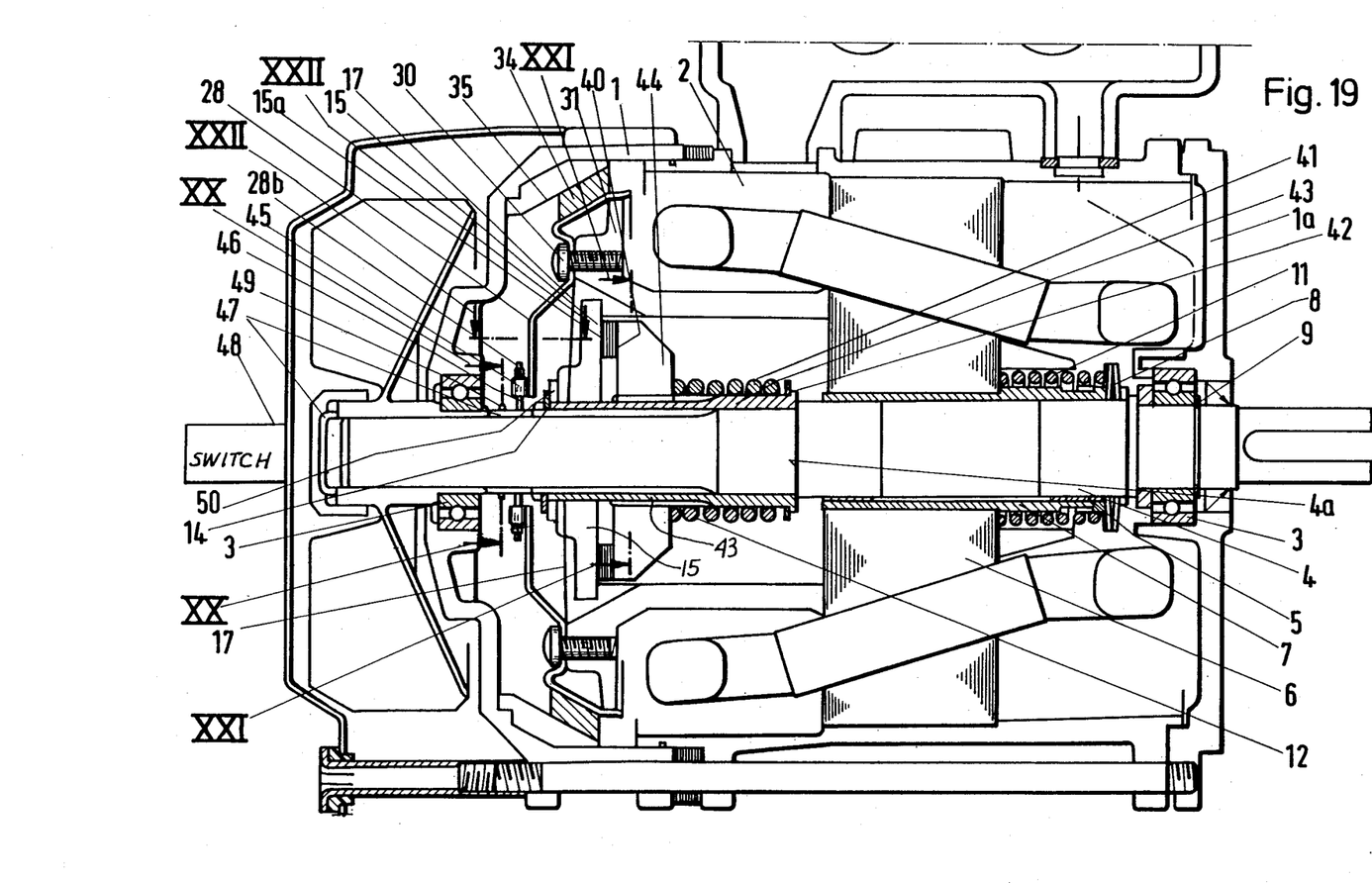
FIG. 19 is a longitudinal section view still in accordance with the preferred embodiment of the present invention showing a modification of mounting the membrane carrier to the motor shaft.

Here, then, cams 28b of break-ring 28 force the rolls 45 as shown in FIG. 19 to the left. Since, as stated, axle 46 of the roll 45 is connected to the anchoring element 47, this element 47 will operate the switch 48, as is clearly shown in FIG. 20.

A spring bears against the front bearing 3 and forces the axles 46 with the feeler roller 45 against the brake ring 28 and thereby prevents unintended actuation of the switch 48.

The invention is not limited to the embodiments described above, but all changes and modifications thereof not constituting departures from the spirit and scope of the invention are intended to be included.

We claim:

1. An electrical motor comprising stator and an axially displaceable spring-biased rotor for assuming a first axial position of running and a second axial position upon braking, there being a motor shaft mounted in bearings in a housing for the motor,
   at least one deformable rotor mounting element having radial outer portion means fastened to at least one end of the rotor, said element having individual arm means with inward radially extensions for being relatively easily deformable in axial direction to permit axial displacement of the rotor relative to the shaft, said element being aximuthally and peripherally stiff and relatively undeformable in peripheral direction for the transmission of torque from the rotor upon the shaft; and carrying means for connecting the deformable rotor mounting element to the shaft.

2. Motor as in claim 1 said deformable rotor mounting element being at least one membrane.

3. Motor as in claim 1 and including an axially movable glide means on the shaft, for axially guiding said rotor on its other side without participating in transmission in torque.

4. An electrical motor comprising stator and an axially displaceable spring-biased rotor, further having a motor shaft mounted in bearings in a housing for the motor, there being brake means for stopping rotation when said spring-biased rotor is urged against the brake means, at least one carrier ring mounted on said shaft for rotation therewith;

an annular sleeve-like extension of the rotor having a plurality of first fastening points;

membrane means having a plurality of individual arm means with at least partial radial inward extension and being elastically deflectible in axial direction but relatively stiff in azumuthal direction for transmission of torque, the membrane means having a peripheral portion and being connected therewith to said first fastening points, there being additional fastening points for the membrane means, spaced radially and peripherally from the first fastening points by the arm means of the membrane that will easily deflect in axial direction but act stiffly in azimuthal direction; and means for connecting the additional fastening points to said carrier ring.

5. Motor as in claim 4, said carrier ring being splined to the shaft for positively imparting rotation on the shaft, there being additional means acting on the carrier ring to prevent axial displacement of the ring relative to the shaft.

6. Motor as in claim 4, said carrier ring being mounted to the shaft via a slip friction coupling.

7. Motor as in claim 4, said carrier ring fastened to a relatively radially inner portion of the membrane means by the additional fastening points of an axial extension of the rotor.

8. Motor as in claim 4, said carrier ring and said rotor being fastened peripherally to the membrane means in peripherally alternating connections including said first and said additional fastening points.

9. Motor as in claim 2, said membrane means being of star shaped configuration having at least three arms, said motor additionally including a short circuiting ring, said arms of the star-shaped membrane means being yieldingly connected to said short-circuiting ring.

10. Motor as in claim 1, said deformable, rotor mounting element being a membrane having an inner ring and radially outwardly extending membrane arms, there being a fastening ring for holding said arms, said fastening ring being bolted to the short-circuiting ring.

11. Motor as in claim 1, said deformable, rotor mounting element being two membranes each having an inner ring and radially outwardly spirally shaped arms, the arms of the two membranes being oppositely oriented, said arms being secured to or integral with a fastening ring, said fastening ring connected to the rotor there being at least one spacer for separating said membranes in the vicinity of the shaft.

12. Motor as in claim 1 said deformable, rotor mounting element being a frame-like element having a plurality of peripheral fastening points, every other one of said fastening point being secured to said rotor, in between situated fastening points being secured to a carrier ring being said means for connecting.

13. Motor as in claim 12, said frame-like elemenmt being of polygonal configuration, said fastening points being situated at corners of the polygon.

14. Motor as in claim 13, said frame-like element being composed of a plurality of pieces wherein the center and end points are provided to serve as said fastening points.

15. Motor as in claim 13, said frame-like element being assembled from a plurality of flat bars, said fasting points being situated at end points of the bars.

16. Motor as in claim 1, there being a plurality of juxtaposed deformable elements.

17. Motor as in claim 4, said carrier ring having radial extending follower arms, said additional fastening points being azimuthally spaced from the first point, the membrane means including flat bars establishing a polygon.

18. Motor as in claim 17, said follower arms of said carrier ring being provided with extensions to which said membrane means in connected, said rotor having an annular extension being provided with pockets clearingly receiving said projections of said follower arms, said membrane means being separately connected to said annular extension.

19. Motor as in claim 4, connections at said first fastening points including rings having edges being forced, respectively, into said carrier ring and said rotor upon bolting of the membrane against the rings, respectively.

20. Motor as in claim 6, there being a coupling spring bearing against a collar of a sleeve splined with the shaft as well as a coupling ring.

21. Motor as in claim 6, there being a turn-off switch actuated when said coupling slips.

22. Motor as in claim 4, said carrier ring having fastening points on a circle smaller than a circle delineated by the first fastening points, the membrane means having a central portion having said additional fastening points for fastening to the fastening points of the carrier ring, said membrane means having radially extending resilient arms, separately resiliently fastened to said first fastening points.

23. Motor as in claim 4, said carrier ring having fastening points on a circle smaller than a circle delineated by the first fastening points, the membrane means having a central portion having said additional fastening points for fastening to the fastening points of the carrier ring, said membrane means having radially extending resilient arms, the ends of the arms being interconnected by a ring, the ring having fastening points in-between arm ends, the latter fastening points being bolted to the first fastening points of the carrier ring.

24. Motor as in claim 4, said carrier ring having fastening points on a circle smaller than a circle delineated by the first fastening points, the membrane means having a central portion having said additional fastening points for fastening to the fastening points of the carrier ring, said membrane means having radially extending spirally curved resilient arms ending in a common ring said common ring being bolted to said first fastening points.

* * * * *